United States Patent [19]

Inverarity et al.

[11] Patent Number: 5,100,936

[45] Date of Patent: Mar. 31, 1992

[54] CELLULOSE FIBER FILLED AMINOPLAST RESIN COMPOSITIONS FOR FLAME RETARDING POLYURETHANE FOAMS

[75] Inventors: George Inverarity, Kingswinford; Geoffrey P. Twiss, Stockport, both of England

[73] Assignee: BIP Chemicals Limited, Manchester, England

[21] Appl. No.: 444,955

[22] Filed: Dec. 4, 1989

[30] Foreign Application Priority Data

Dec. 22, 1988 [GB] United Kingdom ............ 8829943

[51] Int. Cl.$^5$ ............ C08L 1/00; C08J 3/02; C08J 3/05; C08J 9/16
[52] U.S. Cl. ............ 524/35; 521/59; 521/67; 521/68; 521/72
[58] Field of Search ............ 524/35; 521/59, 67, 521/68, 72

[56] References Cited

U.S. PATENT DOCUMENTS 4,833,182  5/1989  Israel et al. ............ 524/14

FOREIGN PATENT DOCUMENTS 597726  2/1948  United Kingdom .
2133801  8/1984  United Kingdom .

*Primary Examiner*—Nathan M. Nutter
*Assistant Examiner*—Jeffrey Mullis
*Attorney, Agent, or Firm*—Nixon & Vanderhye

[57] ABSTRACT

The flame retardance of polyurethane foams is improved by dispersing in a polyol used to make the urethane foam a finely divided resin composition composed of 60–85 wt % of an aminoplast resin filled with 40 to 15 wt % of an aminoplast resin filled with 40 to 15 wt % of cellulose fiber.

7 Claims, No Drawings

CELLULOSE FIBER FILLED AMINOPLAST RESIN COMPOSITIONS FOR FLAME RETARDING POLYURETHANE FOAMS

This invention relates to polyurethanes, particularly to cellular polyurethane products (foams) of reduced flammability and materials for use in the manufacture of them.

Various additives have been proposed for reducing the flammability of polyurethane foams. For example, exfoliated graphite (GB-B-2,168,706) can be used, but is relatively scarce. Melamine can also be used, but at effective levels it tends to degrade the foam properties.

GB-A-2,133,801 describes the preparation of polyol dispersions of a solid aminoplast resin for use in the manufacture of flame-retarded polyurethane foams. The aminoplast may for example be a melamine-formaldehyde resin with a ratio of formaldehyde to melamine in the range 3:1 to 6:1 or a urea-formaldehyde resin with a ratio of formaldehyde to urea in the range 1:1 to 2:1.

We have now found that the performance of an aminoplast resin as a flame retardant in polyurethane foams is unexpectedly improved if a cellulose filler is included with the resin.

In accordance with the present invention there is provided a dispersion in a polyol of a finely divided solid resin composition comprising 60 to 85 percent by weight of aminoplast resin and 40 to 15 percent by weight of cellulose filler.

The amount of solid resin composition in the dispersion may be up to 80 parts by weight per 100 parts by weight of polyol, and preferably forms 12 to 80 parts per 100 of polyol.

As in GB-A-2,133,801, the polyols employed include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols or diols, ammonia, and amines including aromatic, aliphatic and heterocyclic amines as well as mixtures thereof. Alkylene oxide adducts of compounds which contain one —SH group and one —OH group as well as those which contain an amino group and a —SH group may be used. Generally, the equivalent weight of the polyols will vary from 100 to 10,000, particularly from 1000 to 3000 and they will contain from 2 to 8 active hydrogen atoms.

Flame retarded polyurethane foams may be prepared from the dispersions of this invention by the conventional reaction of an organic polyisocyanate with the polyol in which the resin composition is dispersed. The reaction will usually be carried out in the presence of additives such as surfactants and other additives which may be desired, as well as a blowing agent.

The solid resin composition may be prepared by impregnating cellulose fibre with an aqueous amino resin, drying the resulting product and disintegrating and grinding to a fine powder the dry solid produced. The resin at this stage need not be fully cured, and the composition is in fact preferably used with the resin only partially cured.

The aminoplast resin used may be based on urea or melamine but is preferably a melamine-formaldehyde resin, or a resin made from a melamine derivative.

The particle size of the resin composition is significant and should not be greater than 150 microns (mean particle size). The preferred size range is 20 to 50 microns (mean particle size).

The resin composition is preferably used in conjunction with melamine itself as flame retardant additive, in which case solid melamine (also of fine particle size) is included in dispersion in the polyol.

The invention also includes polyurethane foams made by reacting organic polyisocyanates with the polyol dispersion.

We have found that the fire performance of polyurethane foams made from the polyol dispersion of the invention is superior to that of foams made from a polyol dispersion of aminoplast resin alone. We believe that this is because the presence of the cellulose filler, which will burn but does not melt, improves the structural integrity of the char formed during burning, which helps to protect unburnt foam beneath the char.

The invention will now be described in more detail by means of Examples.

EXAMPLE

Standard, furniture-type, polyurethane foams prepared by reaction of toluene diisocyanate with a polyether polyol were modified by including an aminoplast resin composition and/or melamine dispersed in the polyol used for polyurethane preparation.

The aminoplast resin composition used contained 70% by weight of a partially cured melamine-formaldehyde resin (M/F ratio 1 to 2.0) and 30% by weight of cellulose, and had a mean particle size of 20 to 30 microns.

The amounts of aminoplast resin composition and melamine dispersed in the polyether polyol are given in Table I later.

To manufacture polyurethane foam samples an amount of polyol dispersion containing 100 parts by weight of polyol was mixed with stannous octoate (0.14 parts by weight), 3.0 parts by weight of water and 107 parts by weight of 80/20 2, 4/2, 6-toluene diisocyanate, the ingredients being added in the order listed. The mixture was stirred for 10 seconds in each case and then poured into a mould, where the mixture foamed and set.

Foam samples for fire testing were cut from the blocks of foam so made, each fire test being conducted according to British Standard BS5852 Part 2 1982.

The results of the fire tests are given in Table I below, in which AMP=aminoplast resin composition.

TABLE I

| Example | AMP | MELAMINE | Test with IGNITION CRIB 5, BS 5852 |
| --- | --- | --- | --- |
| 1 | 0 | 35 | Melt through (FAIL) |
| 2 | 10 | 35 | Melt through (FAIL) |
| 3 | 15 | 35 | Excellent char-no melt through (PASS) |
| 4 | 25 | 35 | Good pass (but not as good as Ex. 3) |
| 5 | 35 | 35 | Fair pass |
| 6 | 15 | 25 | Good pass |

We claim:
1. A polyol composition suitable for use in the manufacture of flame-retardant polyurethane foam, comprising a dispersion in a polyol of a finely divided solid resin composition in which the solid resin composition forms 12 to 80 parts by weight per 100 parts by weight of polyol, the finely divided solid resin composition con- sisting essentially of 60 to 85 percent by weight of aminoplast resin and 40 to 15 percent by weight of cellulose fiber filler.

2. A polyol composition according to claim 1 in which the particle size of the dispersed resin composition is in the range 20–50 μm.

3. A polyol composition according to claim 1 which includes finely divided solid melamine.

4. A polyol composition according to claim 1 in which the polyol has an equivalent weight in the range 100–10,000.

5. A dispersion suitable for use in the manufacture of flame retardant polyurethane foams, comprising a dispersion in a polyol of
  (i) a finely divided solid resin composition which comprises 60–85 percent by weight of aminoplast resin and 40–15 percent by weight of cellulose fiber filler, and
  (ii) finely divided solid melamine.

6. In a method of making a flame-retardant polyurethane foam by the reaction of an organic polyisocyanate with a polyol in presence of a blowing agent, the polyol functioning both as reactant and as dispersion medium for a disperse phase of finely divided aminoplast resin which confers flame retardant properties on said foam, the improvement which consists in employing finely divided cellulose fiber as an additional ingredient of said disperse phase thereby to enhance said flame retardant properties.

7. A method according to claim 6, in which said polyol dispersion medium further includes finely divided melamine in dispersed form.

* * * * *